United States Patent Office 3,788,832
Patented Jan. 29, 1974

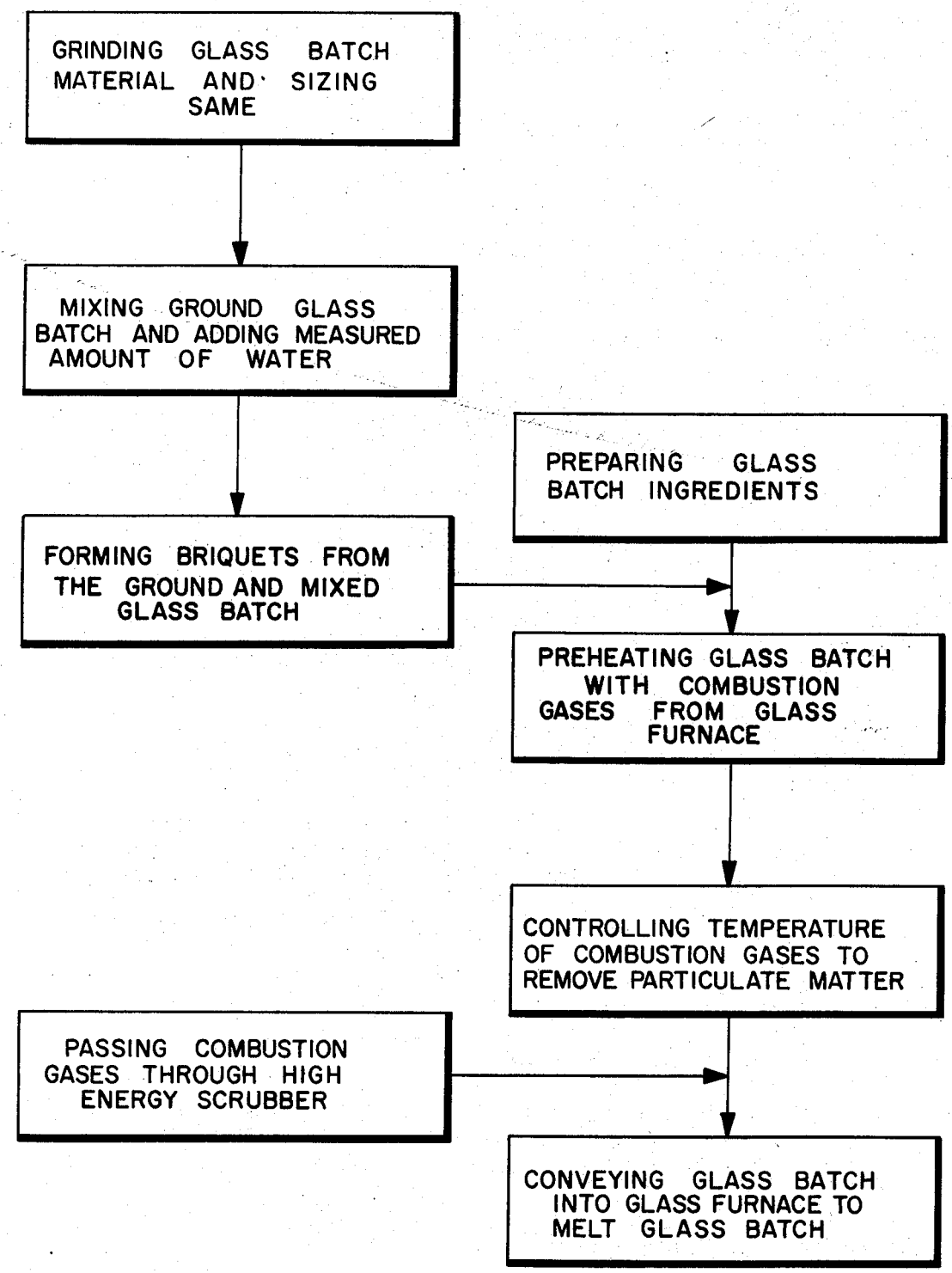

3,788,832
PROCESS FOR PRE-TREATING AND MELTING GLASSMAKING MATERIALS
John D. Nesbitt and Mark E. Fejer, Chicago, Ill., assignors to Institute of Gas Technology, Chicago, Ill.
Filed Aug. 25, 1972, Ser. No. 283,926
Int. Cl. C03b 5/16
U.S. Cl. 65—134                              14 Claims

ABSTRACT OF THE DISCLOSURE

An improved process for pre-treating and melting glassmaking materials wherein, in a preferred embodiment, the glass batch is compacted or agglomerated into distinct units, preheated and then conveyed into a glass furnace or melter. The glass batch preferably is compacted into briquets using an improved process, and the glass batch is preheated with the combustion gases from the glass furnace in a fashion such that particulate matter, particularly sodium sulfate, is removed from the combustion gases. Melting preferably is accomplished using a submerged combustion process.

BACKGROUND OF THE INVENTION

This invention relates to an improved process for pre-treating and melting glassmaking materials.

Air pollution emission regulations, economic considerations and the current scarcity of fuels require that the glass industry find a means for reducing the emission of pollutants, for improving fuel efficiency and for obtaining higher productivity.

One of the major problems in the usual glassmaking process employing mixed course powders as feed material is segregation of the different batch constituents during storage, conveying, feeding and even during the melting process. Agglomerating the batch materials into a durable homogeneous compacted discrete shape assures retention of homogenity and intimate contact of silica and fluxing agents until melting is complete thus accelerating the melting process and improving glass quality.

In normal glass batch preparation, the raw batch is mixed and fed in granulated form into the melting furnace. Mixing and feeding raw batches in this fashion has many disadvantages, an important one of which is the fact that the raw batch is subject to dusting. The adverse effects resulting from this dusting is overcome, to a small degree, by adding a small volume by weight of water to the raw batch during the mixing thereof.

More recently it has been proposed to pre-treat the raw glass batch, and form it into an agglomerate in the form of a homogeneous pellet, briquet, frit or other discrete unit. Such an agglomerated glass batch substantially eliminates the problem of dusting. In addition, it has been found that an agglomerated glass batch has better melting and higher conductivity characteristics than the normal raw glass batch, so that additional advantages are provided.

While these improvements have been made in the preparation of the glass batch, the glass industry is further striving to improve glass melting technique and furnace constructions. In this respect, one substantial improvement has been the submerged combustion burner, such as the one disclosed in U.S. Pat. 3,260,587. Submerged combustion involves burning the fuel below the glass and allowing the combustion gases to pass through the molten medium transferring heat to the medium through which they pass.

An additional advantage of using the submerged combustion burner is the large reduction in the amount of nitrogen oxides as a part of the stack emissions. In the submerged combustion process, the very rapid heat transfer to the glass batch and molten glass depresses flame temperature and reduces gas residence time at high temperature. These are the critical factors in the nitrogen fixation reactions.

Nitrogen oxides, however, only comprise some of the pollutants from the combustion gases, and present pollution control standards require that the stack emissions be further cleared of particulate materials. A major one of the pollutants is sodium sulfate which is ejected into the atmosphere in the form of submicron particles. So far, efforts to collect these submicron particles have been uneconomical.

In view of the above generally outlined problems existing in the field of glassmaking, continued efforts have been and are being made to melt glass faster and more uniformly. In this respect, substantial efforts have been directed to improve the raw materials and the preparation of the glass batch, as well as improved methods for glass melting and furnace construction.

Accordingly, it is an object of the present invention to provide an improved process for pre-treating and melting glassmaking materials.

A further object is to provide such an improved process which will increase the production of the glass furnace or melter.

A still further object is to provide such an improved process which not only will increase the production of the glass furnace, but will remove a major pollutant (sodium sulfate) from the combustion gases.

Still another object is to provide an improved process for briquetting the raw glass batch. In this respect, it is contemplated that the raw glass batch be formed into briquets without the need of binders.

A still further object is to provide an improved process or method of preheating the raw glass batch to increase fuel efficiency and productivity, and to decrease the capital cost of the melting equipment.

A still further object is to provide an improved process for removing particulate matter, particularly sodium sulfate, from the combustion gases, in a fashion such that valuable batch ingredients can be recycled back into the batching process.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

The drawing illustrates the steps employed in this invention.

DESCRIPTION OF THE PREFERRED EMBODIMENT

In accordance with the present invention, the raw glass batch preferably is agglomerated or compacted into briquets, pellets, frit, or any other form where distinct units are provided, before introducing the glass batch into the furnace or melter. By agglomerating or compacting the raw glass batch, dusting and batch carry-over is substantially, if not completely, eliminated. Furthermore, as more fully explained below, particulate matter, particularly sodium sulfate, can be removed from the ejected combustion products and the glass batch can be preheated. Accordingly, much of the pollutants in the ejected combustion products can be removed and a reduction of the fuel required to melt the glass batch is realized.

The agglomerated or compacted glass batch is preheated in a fashion such that the sodium sulfate removed from the ejected combustion products is recovered and recycled in the glass batch, thus reducing the glass batch cost by reducing consumption of this expensive ingredient.

The combustion products preferably also are routed into a high energy scrubber in which the rest of the particulate matter is removed. In the high energy scrubber, the sodium sulfate, which is highly soluble in water, can be recovered and recycled, by purifying the water to remove the sodium sulfate. The purified water then can be reused for additional scrubbing in the high energy scrubber.

In melting the glass batch, submerged combustion preferably is used, to further reduce the fuel consumption. This reduction is provided by the increase in the rate of heat transfer to the glass batch. A large reduction in the amount of nitrogen oxides as a part of the stack emissions also is provided, for the reasons set forth above. A still further advantage is realized from the fact that the compacted glass batch can be introduced below the surface of the molten glass, a fact which further improves the rate at which the glass batch is melted.

From the above brief description of the process of the present invention, it can be seen that pollution can be substantially controlled, batch costs and fuel costs can be reduced per ton of glass manufactured, and better glass (fewer seeds) can be made. Furthermore, while it is preferred to form a compacted glass batch, certain of the advantages and improvements discussed can be provided in glassmaking per se, as more fully described below.

More particularly, as indicated above, the raw glass batch preferably is agglomerated or compacted into briquets, pellets, frit, or any other form where distinct units are provided, before introducing the glass batch into the furnace or melter.

Various different methods of pelletizing the raw glass batch have been proposed, one of which is disclosed in U.S. Pat. 3,542,534. As therein disclosed, the raw materials for glassmaking are initially pulverized to powders within a critical range of subdivision; the subdivided powders are then thoroughly mixed, preferably by a dry mixing process; the substantially uniform mixture of particles is then agglomerated to pellets having grain sizes within an optimum range by subjecting the particles to a tumbling action, causing them to roll over one another repeatedly in the presence of a critical range of water content; and the pellets are dried at a temperature within an optimum range, thereby providing the raw material charge for the glassmaking furnace in a form which facilitates the vitrification process. Caustic soda, preferably in liquid form, is added to the batch to increase the binding characteristics of the powder ingredients to the extent that the subsequently formed pellets had the requisite strength.

While the raw glass batch can be agglomerated into pellets and used in the process of the present invention, it is preferred to compact the glass batch into briquets. A pelletizing process such as the one described above requires moisture addition during pelletizing, and thus, is not amendable to automation. Furthermore, product size surging is characteristic of such process, thus requiring the additional step of sizing the pellets before introducing them into the furnace.

Numerous attempts have been made to briquet the raw glass batch, but the attempts generally have not been successful, for one reason or another. Also, in most cases, extraneous binders such as inorganic salts, for example, metal silicates or phosphates; or organic binders, such as phenolic resins, have had to be added to the glass batch in order to give the briquets the required strength characteristics. Such binders are disadvantageous, not only because of the added expense, but particularly because the introduction of undesired impurities and heterogenity into the resulting glass creates added problems.

In accordance with the present invention, a high-strength, homogeneous briquet is formed without the need of an extraneous binder by a process wherein the raw glass batch is mixed together and ground in a mill such that 50% or more of the material passes through a standard 100 mesh screen. The material so ground is then mixed with water within a critical range by weight of the total batch material and fed into a common briquetting machine after which the resulting briquets are dried in warm air.

The critical ranges, which are essential in obtaining the advantages resulting from briquetting the glass batch in accordance with the present invention, are set forth below.

The raw glass batch is fed into an open-circuit grinder which serves as a blending or mixing device as well as a means for size reduction to a point such that at least 50% of the raw glass batch passes through a standard 100 mesh screen. The ground and mixed glass batch material then is dumped into a standard muller-type mixing device.

A measured amount of water is added to the ground and mixed glass batch during the mulling operation. The amount of water is critical in that less than 8% by weight of water addition gives a weak product or briquet which fragments under impact or reasonable pressure and cannot withstand normal handling of the wet product. If more than 15% by weight of water is added, the mixed product cannot be satisfactorily fed to the briquet operation. The preferred weight range of water addition is 10–13% to provide a briquet which can withstand impact and abrasive loads normally encountered during conveying and drying operations.

The mix-mulling time also is critical in that less than 4 minutes causes the batch material to plug the feed hopper for the briquetting machine. At 5 minutes or longer mixing time, enough of the hydro-setting or hydrolysis reaction has been completed to produce optimum strength of batch compact in briquetting operation. Mixing for longer than 6 minutes requires an unnecessary increase in the size of the mixing equipment. Accordingly, a minimum mixing period or time of 4–6 minutes is critical for satisfactory feeding of the batch material to the briquetting process.

One of the unique features of the muller-mixing-briquetting process is that batch segregation cannot occur after moisture addition, whereas in the pelletizing process which is fed by dry batch mixture, a certain amount of segregation occurs as the dry material is fed to the disc or cone pelletizer. This can cause substantial variation in chemical analysis from pellet to pellet.

As indicated, the mixed batch is fed into a common briquetting machine such as those manufactured by K. R. Komarek, Inc. of Elk Grove Village, Ill., compacted into briquets and then dried in warm air, to no more than 1% water content, preferably in a counterflow shaft process. A preferred size briquet is one which is approximately 1 inch by ½ inch by ¼ inch, because of its strength and melting characteristics. A larger briquet approximately 1½ inches by ⅞ inch by ½ inch has also been produced but with less desirable strength. In the range of briquet sizes which can be produced, the preferred size of a briquet is a trade-off between product strength, melting characteristics and cost, with the preferred size briquet being the one first indicated above.

The raw glass batch, preferably compacted into briquets, is preheated before being fed into the furnace or melter. It is known to preheat the glass batch to improve overall process fuel efficiency but not to remove particulate matter and particularly sodium sulfate from the ejected combustion products. When preheated in accordance with the present invention, the sodium sulfate is recovered and recycled in the glass batch thus reducing the glass batch cost by reducing the consumption of this expensive ingredient. As to this aspect of the process, the compacted glass batch can be dried and simultaneously preheated, with the particulate matter being removed from the combustion products.

More particularly, the glass batch is heated by a counterflowing stream of the hot combustion gases (500–1350°

F.), preferably in a moving bed shaft preheater. Other apparatus and arrangements wherein the combustion gases can flow through the glass batch in a counterflow relation also can be used. Combustion products having passed through the combustion air heat exchanger and consequently being at a temperature of approximately 1300° F. are conveyed to the lower part of the preheater and flow counter to the batch flow. In this manner, not only is the batch preheated, but also the particulate matter which is being carried in the combustion products and which would normally be ejected out of the stack is removed by the packed bed. Tests indicate that the major particulate carried in the combustion products is sodium sulfate. In a glass furnace or melter, the sodium sulfate portion of the glass batch material is vaporized forming elemental sodium and sulfur dioxide. When the vapors are cooled below 1600° F., these components recombine to form solid sodium sulfate. Part of this particulate condenses in the regenerators and chemically attacks the checkerbrick while the rest is conveyed by the flue products and is ejected from the stack.

By controlling the temperature of the combustion gases used for preheating the glass batch and containing vaporized sodium sulfate, the particulate can be made to condense on the surfaces of the glass batch. Temperatures are critical since if the combustion gases are higher than 1400° F., the glass batch will begin to soften and melt prematurely.

The tests conducted further show that removal of the particulate matter by the packed bed is significantly better at lower bed temperatures. For example, at a gas temperature of 585° F., approximately 35% of the particulate is removed, but at 1250° F., only 8% is removed. There are, however, several factors which affect the rate of removal. These factors include not only temperature, but also space velocity (the volume of gas passing through the bed in a given amount of time), the concentration of particles in the gas stream and velocity of the particles.

During testing, dilution air was introduced into the system to change the combustion gas temperature. Doing so changed the space velocity of the gases considerably. At lower temperatures, more dilution air is required. In addition, by adding dilution air, the concentration of the particulate matter in the gas stream is decreased. Thus, at lower temperatures, it would be expected that less particulate matter would be collected in the bed because (1) the space velocity is higher allowing for shorter periods of contact being the particles and the packed bed, and (2) the concentration of particulates in the gases passing through the bed is lower. However, the results showed that just the opposite occurred. The amount of particulate removal increased with higher space velocities and lower particulate concentrations. From this, it was concluded that the major factor affecting removal by the packed bed is temperature. Furthermore, if temperature is the major factor affecting particulate removal, a greater part of the sodium sulfate is removed further up the bed where the temperatures are cooler.

Using each temperature tested as a sample of an actual preheated bed, a mathematical determination indicates that 61% of the sodium sulfate will be removed in a packed bed 2½ feet thick. If the thickness of the bed is increased, the amount of removal is also increased.

Since the sodium sulfate is removed from the combustion gases and carried in the packed bed of glass batch, the process has the additional advantage of returning the sodium sulfate back to the glass furnace or melter, as the preheated glass batch is fed into the furnace or melter. Accordingly, not only are the pollutants removed from the combustion gases, but the sodium sulfate is recycled, thus saving substantially on the cost of this ingredient of the glass batch.

After combustion gases have been passed through the packed bed of glass batch to preheat the latter and to remove the sodium sulfate from the gases, the gases preferably and advantageously are then routed through a high energy scrubber. The high energy scrubber will remove the water soluble particulate matter, as well as a substantial portion of the insoluble material. This additional step is highly feasible in the process because of the high solubility of sodium sulfate in water, approximately 45 gm. per 100 cc. of water at 70° F.

Part of the water used in the high energy scrubber can be recycled into the compacting process, while the remainder of the water can be purified by removing the sodium sulfate, which then can be recycled back into the batch processing and reusing the purified water for additional scrubbing.

The preheat glass batch fed into the glass furnace or melter can be melted in any one of the conventional methods. However, in addition to the reduction in fuel consumption obtained by preheating the glass batch, a further reduction can be realized by increasing the rate of heat transfer to the glass batch, by using the submerged combustion method of melting the glass batch. As indicated above, a submerged combustion burner and arrangement of the type disclosed in U.S. Pat. 3,260,587 can be employed. Generally, as fully described in this patent, submerged combustion involves burning the fuel below the glass and allowing the combustion gases to pass through the molten medium transferring heat to the medium through which they pass.

An additional advantage of using this technique or method of melting is the large reduction in the amount of nitrogen oxides as a part of the stack emissions. As indicated above, the very rapid heat transfer to the glass batch and molten glass depressed flame temperature and reduced gas residence time at high temperatures, and these are the critical factors in the nitrogen fixation reactions.

From the above description, it can be seen that an improved process for pre-treating and melting glassmaking material, including an improved process for compacting the glass batch into briquets is disclosed. With this process, pollution can be substantially reduced, batch costs and fuel costs can be reduced per ton of glass manufactured, and better glass (fewer seeds) can be made.

It will thus be seen that the objects set forth above, among those made apparent from the preceding description, are efficiently attained and certain changes may be made in carrying out the above process. Accordingly, it is intended that all mater contained in the above description shall be interpreted as illustrative and not in a limiting sense.

Now that the invention has been described, what is claimed as new and desired to be secured by Letters Patent is:

1. A process for pre-treating and melting glassmaking materials, said materials comprising a glass batch including as main raw materials silica, limestone, and sodium carbonate, said process comprising the steps of: compacting or agglomerating said glass batch to form distinct units; conveying said glass batch into a preheater and preheating said glass batch by passing the combustion gases from the glass furnace through said preheater in contact with and counter to the flow of said glass batch therein; removing particulate matter including sodium sulfate from said combustion gases in said glass batch in said preheater by controlling the temperature of said combustion gases passed into said preheater to preheat said glass batch to cause the particulate matter to collect on the surfaces of the distinct units forming said glass batch, said particulate matter and particularly sodium sulfate thereby being recovered and recycled into said glass furnace; and feeding said preheated glass batch into a glass furnace and melting said glass batch.

2. The process of claim 1, wherein the temperature of the combustion gases passed into said preheater are controlled so that the temperature is below 1400° F. and preferably within a range of 500–1350° F. to thereby both preheat said glass batch while preventing softening and premature melting thereof and providing for the removal of the particulate matter.

3. The process of claim 2, further including the step of routing the combustion gases from said preheater into a high energy scrubber in which the remaining particulate matter is removed.

4. The process of claim 3, further including the step of recycling water from said high energy scrubber back into the compacting or agglomerating process.

5. The process of claim 4, further including the step of increasing the concentration of water soluble particulate material in a portion of the scrubber recycle stream, recyling said concentrated stream back to the batch compaction process, and recycling the purified water to said high energy scrubber for additional scrubbing.

6. The process of claim 1, wherein said glass furnace is of the submerged combustion type, whereby the rate of heat transfer to said glass batch to melt it is increased and nitrogen oxides are substantially reduced.

7. The process of claim 1, further including the step of pulling a partial vacuum on the molten glass during the fining time to cause the bubbles therein to leave more readily.

8. The process of claim 1, wherein said glass batch is compacted into briquets by a process which comprises the steps of: feeding the glass batch into an open-circuit grinder which serves as a blending and mixing device as well as a means for size reduction to a point such that at least 50% of the glass batch passes through a standard 100 mesh screen; conveying said glass batch from said open-circuit grinder into a standard muller-type mixing device; adding a measured amount of water within a range of 10–15% by weight of the total glass batch to said ground glass batch; establishing a mix-mulling time of 4 to 6 minutes; feeding the mixed glass batch into a standand briquetting machine and forming briquets; and drying said briquets to no more than 1% water content.

9. A process for pre-treating and melting glassmaking materials, said materials comprising a glass batch including as main raw materials silica, limestone and sodium carbonate, said process comprising the steps of: feeding the glass batch into an open-circuit grinder which serves as a blending and mixing device as well as a means for size reduction to a point such that at least 50% of the glass batch passes through a standard 100 mesh screen; conveying said glass batch from said open-circuit grinder into a standard muller-type mixing device; adding a measured amount of water within a range of 8–15%' by weight of the total glass batch to said ground glass batch; establishing a mix-mulling time of 4 to 6 minutes; feeding the mixed glass batch into a standard briquetting machine and forming briquets; drying said briquets to a 2–3% water content; conveying said briquets into a moving bed shaft preheater and preheating said briquets by passing the combustion gases from the glass furnace to the lower part of said preheater in contact with and counter to the flow of said briquets therein; removing particulate matter including sodium sulfate from said combustion gases in said moving bed by controlling the temperature of said combustion gases passed into said preheater to preheat said glass batch to cause the particulate matter to condense on the surface of said briquets, said temperature being controlled within a range of 500–1350° F. to thereby both preheat said briquets while preventing softening and premature melting thereof and providing for the removal of the particulate matter, said particulate matter including sodium sulfate thereby being recovered and recycled into said glass furnace; and feeding said preheated briquets into a glass furnace and melting said briquets.

10. The process of claim 9, further including the step of routing the combustion gases from said preheater into a high energy scrubber in which the remaining particulate matter is removed.

11. The process of claim 10, further including the step of recycling the water from said high energy scrubber back into the compacting or agglomerating process.

12. The process of claim 11, further including the step of increasing the concentration of water soluble particulate material in a portion of the scrubber recycle stream, recycling said concentrated stream back to the batch compaction process, and recycling the purified water to said high energy scrubber for additional scrubbing.

13. The process of claim 12, wherein said glass furnace is of the submerged combustion type, whereby the rate of heat transfer to said glass batch to melt it is increased and nitrogen oxides are substantially reduced.

14. A process for pre-treating glassmaking materials, said materials comprising a glass batch including as main raw materials silica, limestone, sodium carbonate and sodium hydroxide, said process comprising the steps of: feeding the glass batch into an open-circuit grinder which serves as a blending and mixing device as well as a means for size reduction to a point such that at least 50% of the glass batch passes through a standard 100 mesh screen; conveying said glass batch from said open-circuit grinder into a standard muller-type mixing device; adding a measured amount of water within a range of 8–15% by weight of the total glass batch to said ground glass batch; establishing a mix-mulling time of 4 to 6 minutes; feeding the mixed glass batch into a standard briquetting machine and forming briquets; and drying said briquets to a 2–3% water content.

References Cited

UNITED STATES PATENTS

| | | | |
|---|---|---|---|
| 1,581,829 | 4/1926 | Berry | 65—136 X |
| 3,260,587 | 7/1966 | Dolf et al. | 65—136 X |
| 3,542,534 | 11/1970 | Yamamoto | 65—134 X |
| 3,607,190 | 9/1971 | Penberthy | 65—134 |

ROBERT L. LINDSAY, JR., Primary Examiner

U.S. Cl. X.R.

65—135